United States Patent [19]

Maddox, Jr. et al.

[11] Patent Number: 4,518,038

[45] Date of Patent: May 21, 1985

[54] METHOD OF EXTRACTING AND REUTILIZING SURFACTANTS FROM EMULSIONS USING SULFONATED ALKYL BENZENES AND ETHOXYLATED PHENOLS

[75] Inventors: Jim Maddox, Jr.; Vernon H. Schievelbein, both of Houston, Tex.

[73] Assignee: Texaco Inc., White Plains, N.Y.

[21] Appl. No.: 559,076

[22] Filed: Dec. 7, 1983

[51] Int. Cl.³ .................... E21B 43/22; E21B 43/40
[52] U.S. Cl. .................................. 166/266; 208/188; 252/8.55 D
[58] Field of Search .............. 252/8.55 D, 332; 166/266, 267; 208/188

[56] References Cited

U.S. PATENT DOCUMENTS

| | | | |
|---|---|---|---|
| 3,637,521 | 1/1972 | Tsuk | 252/326 |
| 3,687,845 | 8/1972 | Trent et al. | 210/54 |
| 3,952,803 | 4/1976 | Kerfoot et al. | 252/8.55 X |
| 4,029,570 | 6/1977 | Coffman et al. | 208/188 |
| 4,058,467 | 11/1977 | Sias | 252/8.55 |
| 4,073,344 | 2/1978 | Hall | 166/307 |
| 4,216,079 | 8/1980 | Newcombe | 208/188 |
| 4,235,712 | 11/1980 | McClaflin | 210/708 |
| 4,261,812 | 4/1981 | Newcombe | 208/188 |
| 4,277,352 | 7/1981 | Allison et al. | 252/8.55 D |
| 4,370,238 | 1/1983 | Tackett, Jr. | 210/639 |

Primary Examiner—Herbert B. Guynn
Attorney, Agent, or Firm—Jack H. Park; Kenneth R. Priem; Harold J. Delhommer

[57] ABSTRACT

The disclosed invention is a one step or two step process for extracting surfactant from produced emulsions of oil, water and surfactants, concentrating the surfactants into a relatively small volume emulsion middle phase that can be reutilized in surfactant flooding and separating substantial quantities of salable oil from the emulsions.

In the two step process, a sulfonated alkyl benzene is added and mixed with the emulsion, which partitions upon settlement into three phases, a clean oil phase, a first microemulsion middle phase and an aqueous phase. An ethoxylated phenol is then added and mixed to the first middle phase to yield at least two more similar phases with the middle phase containing the concentrated surfactants. Alternately, the sulfonated alkyl benzene and the ethoxylated phenol can be combined and added in a one step extraction process.

21 Claims, No Drawings

METHOD OF EXTRACTING AND REUTILIZING SURFACTANTS FROM EMULSIONS USING SULFONATED ALKYL BENZENES AND ETHOXYLATED PHENOLS

FIELD OF THE INVENTION

This invention is related to copending U.S. patent application Ser. No. 462,579, filed Jan. 31, 1983 and copending U.S. patent application Ser. No. 559,077, filed Dec. 7, 1983. More particularly, the invention relates to the extraction and reutilization of surfactants from oil, water and chemical emulsions that are produced as a result of enhanced oil recovery operations.

BACKGROUND OF THE INVENTION

Surfactant flooding has become one of the more promising enhanced oil recovery techniques for recovering oil after water flooding. Generally, the method of surfactant flooding employs the injection of a surfactant in an aqueous solution or in an emulsion to sweep through the formation and recover oil. It is believed that surfactants are effective because of their ability to reduce the interfacial tension between crude oil and water. This reduction of interfacial tension permits the creation of various oil, water and surfactant emulsions in the formation. Thus, the produced liquids of surfactant flooding are generally stable oil, water and surfactant emulsions.

Because of the relative amounts of oil and water produced in chemical flooding, the produced emulsions will usually be oil-in-water emulsions. Upon settling, such emulsions may change to the water-in-oil emulsions which are usually encountered in primary petroleum production. Conventional surfactant extraction and emulsion breaking techniques which work on water-in-oil emulsions may be ineffective with oil-in-water emulsions.

Second, the creation of these generally highly stable emulsions results in decreased surfactant reutilization efficiency. Considerable quantities of surfactants are entrained in the produced emulsions which prevents the effective reutilization of the produced surfactant in the continuing surfactant flooding process. Because surfactants are expensive additives for chemical floods, commercial economics require that surfactant costs be minimized by reutilizing a substantial quantity of surfactant that is injected into the formation. The produced emulsions cannot be recycled because the surfactants in the emulsions are too diluted in aqueous volume and frequently, the emulsions are not at the preferred salinity levels. Surfactants injected into a reservoir must not be contaminated with materials that lower the effectiveness of the surfactant.

Third and most importantly, the presence of surfactant in the produced emulsion fluids makes it very difficult to recover oil free of impurities such as surfactant and water. All of the below cited references have attempted to solve the problem of freeing up salable oil from emulsions. One reference, U.S. Pat. No. 4,277,352 has also attempted to recover surfactant for reutilization, but none of the references have addressed the problem of recovering a surfactant free of contaminants which decrease the effectiveness of a surfactant when it is reutilized.

One method of breaking an oil-in-water emulsion is described in U.S. Pat. No. 4,029,570 where an additional formation brine is added to the produced emulsion to produce an oil phase and a water phase. However, such brine addition treatments will in many cases not work on produced fluids. One reason is the tendency of formation rock to selectively adsorb high equivalent weight sulfonates, leaving lower equivalent weight sulfonates behind, rendering the surfactant highly hydrophilic. Such processes will not sufficiently extract and concentrate the surfactant to allow reutilization. The surfactant is often left highly diluted in a relatively large volume of oil-in-water emulsion unsuitable for reutilization.

U.S. Pat. No. 3,637,521 discloses an emulsion breaking process comprising the steps of (1) adding an acid to lower the pH of the emulsion to approximately 5.0 and (2) adding an alkylamine containing 1 to 5 nitrogen atoms and from 2 to 12 carbon atoms. U.S. Pat. No. 3,687,845 describes a process wherein oil-in-water emulsions are treated by the addition of a high molecular weight, watersoluble polymer such as the polyvinyl aromatics of benzene such as polystyrene, polyvinyl toluene and several acrylamide compounds.

Another method which has been tried to break oil-in-water emulsions is the use of additional surface active agents. U.S. Pat. No. 4,261,812 discloses a method which employs an additional surface active agent having an average equivalent weight higher than the equivalent weight of the surface active agents in the produced emulsion, preferably an equivalent weight of about 400 to 600. U.S. Pat. No. 4,073,344 mentions the use of dimethylbenzene ammonium chloride, trimethyl ammonium chloride and alkyl benzene sulfonates for the same purpose. The use of additional solubilizers to break oil-in-water emulsions was promoted by U.S. Pat. No. 4,277,352 which suggests adding materials commonly used as solubilizers in surfactant flooding to the produced emulsion.

Although several of the above discussed methods may provide a way to free crude oil from produced emulsions, none of the references provide a process in which the surfactant can be economically recovered and concentrated for reuse.

SUMMARY OF THE INVENTION

The present invention provides for extracting surfactants from produced emulsions of oil, water and surfactant and concentrating the surfactants into a relatively small volume, emulsion phase that can be reutilized in surfactant flooding. The phases left behind in the extractions are substantially water-free and surfactant-free crude oil phases and crude oil-free aqueous phases. Substantial additional quantities of salable oil are freed by this invention from produced emulsions and flooding surfactants are recovered for reutilization.

The surfactant extraction and concentration method of the present invention is performed by a two step extraction process. The first extraction employs a first extracting compound selected from the group of alkali metal salts and ammonium salts of cumene sulfonate, propyl benzene sulfonate, ethyl benzene sulfonate, methyl ethyl benzene sulfonate, diethyl benzene sulfonate, methyl propyl benzene sulfonate, xylene sulfonate and dicyclopentadiene sulfonate to form three phases, including a crude oil phase, a first middle phase and an aqueous phase. The second extraction step mixes an ethoxylated phenol having an alkyl side chain containing 0 to about 12 carbon atoms with the first middle phase to form at least two additional phases, including a surfactant-rich second middle phase and usually, a third additional phase.

Optionally, the first and second extracting compounds may be added to the emulsion in a common solution for a one-step extraction process.

DETAILED DESCRIPTION

The extraction of surfactants from produced emulsions by the addition of various hydrotropes solves a difficult problem and permits the reutilization of the relatively expensive surfactants employed in chemical oil flooding operations. A significant advantage is provided by the recovery of additional amounts of crude oil substantially free of entrained surfactant and water impurities.

The present invention is related to a similar surfactant extraction process disclosed in copending U.S. patent application Ser. No. 462,579, filed Jan. 31, 1983, the disclosure of which is fully incorporated herein by reference. This invention comprises extracting surfactants from produced water-in-oil or oil-in-water emulsions by the addition of two extracting compounds. Oil-in-water emulsions are handled by first inverting them to water-in-oil emulsions by procedures well known in the art. One such procedure involves the addition of a calcium ion and petroleum sulfonate blend.

In the preferred embodiment, the first extracting compound is added to the produced emulsion in an aqueous solution of about 0.3% to about 6% at a temperature of about 25° C. to about 70° C. The first extracting compound is selected from the group consisting of the alkali metal salts and ammonium salts of cumene sulfonate, propyl benzene sulfonate, ethyl benzene sulfonate, methyl ethyl benzene sulfonate, diethyl benzene sulfonate, methyl propyl benzene sulfonate, xylene sulfonate, and dicyclopentadiene sulfonate. Ammonium salts offer very similar performance to alkali metal salts in enhanced oil recovery applications. The sodium salts of the above compounds are preferred.

During an appropriate separating time of about thirty to about sixty minutes, which may be considerably shorter or longer depending on conditions, most of the surfactant will partition into a first relatively low volume, surfactant-rich emulsion middle phase. The crude oil phase which is partitioned is almost completely free of any surfactant or brine contamination. An oil-free aqueous phase is also partitioned which contains excess extracting compounds.

The second extracting compound in an amount of about 0.1% to about 3% by volume is added and mixed with the first surfactant-rich middle phase. If desired, the second extracting compound can also be incorporated in an aqueous solution. The second extracting compound is an ethoxylated phenol having an alkyl side chain of 0 to about 12 carbon atoms and containing an average of about one to about fifteen ethylene oxide groups. It is most preferred that the alkyl chain have 0 to about five carbon atoms and that the average degree of ethoxylation range from about four to about eight.

Some examples of the second extracting compound are: the ethoxylated compounds of phenol, ethyl phenol, propyl phenol, isopropyl phenol, butyl phenol, isobutyl phenol, pentyl phenol and nonyl phenol, all with an average degree of ethoxylation ranging from about one to about fifteen. The above list is by no means an exclusive listing of the possible second extracting compounds.

In addition, most of the above compounds have three positional isomers—ortho, meta and para isomers—as well as isomers having alkyl chain positional variations. All of the above isomers can be expected to act similarly when used in the method of the present invention. Some isomers will also cost less. For instance, in large quantities, tertiary butyl phenol can be obtained commercially for about 86 cents/lb. while secondary butyl phenol can be had for about 76 cents/lb. Many ortho isomers can be obtained for less cost than the meta or para isomers.

The mixture of ethoxylated phenol and first middle phase will usually separate into three phases during an appropriate time, which may be about thirty to about sixty minutes or longer depending on conditions. As in the first extraction step, the three phases will be an upper surfactant-free and water-free crude oil phase, a second middle phase which is a surfactant-rich microemulsion containing substantial quantities of the second extracting compounds, and a lower aqueous phase free of crude oil containing most of the first extracting compound and some of the second extracting compound. The lower aqueous phase can be recycled for additional extractions.

In some cases, such as when the second extracting compound is 1% by volume phenol having an average of about six ethylene oxide groups, the mixture may only separate into two phases, an upper, substantially surfactant-free and water-free oil phase and a lower phase containing oil, surfactant, extracting compounds and water. But in most cases, the mixture will separate into three phases.

The second middle phase left after the second extraction is substantially smaller in volume than the first middle phase. The decrease in volume is primarily due to the release of significant amounts of crude oil and brine from the first middle phase, resulting in a further concentration of surfactant in a relatively small volume middle phase.

In a second preferred embodiment, the first and second extracting compounds are added to the emulsion in a common aqueous solution for a one step extraction process. Most preferably, the weight ratio of first extracting compound to second extracting compound ranges from about 19/1 to about 3/1. In the one step extraction process, sodium cumene sulfonate is the most preferred first extracting compound to blend with the ethoxylated phenol.

The one step process frees up a comparable amount of salable oil when compared to the two step process. Midphase oil content is reduced to approximately the same level while the necessary surfactant extraction and concentration equipment is cut practically in half.

In another embodiment, the middle phase and the lower aqueous phase from the first extraction step are mixed together with the second extraction compound to yield the final three phases including the surfactant-rich second middle phase. In a fourth embodiment, the middle phase and the lower aqueous phase from the first extraction step are mixed together and allowed to separate into two phases, an upper phase and a lower aqueous phase. The second extraction step is then performed on the upper phase yielding the final three phases including the relatively lower volume, surfactant-rich, second middle phase.

It should be noted that liquids may not settle into separate distinct phases all the time. At times, there may be a small boundary area between two phases which does not distinctly belong to either phase. Sometimes, a complete separation into several phases may take days. Thus, whenever the words "separate" and "separation" are used herein, they refer to a separation that is preponderantly complete.

At times, the addition of water or brine as well as clean crude oil to the emulsion before addition of the extracting compound will aid in extraction efficiency. As in other steps of the extraction and reutilization process, fresh water and brine may be used interchangeably. Although different brines may require different extracting compound concentrations, the process yields excellent performance in both high and low salinities. Thus, fresh water may be used in the process where brine is mentioned, and brine may be employed where water is noted.

The surface active agents extracted may be the commonly used anionic surfactants such as petroleum sulfonates or nonionic surfactants. More specifically, the inventive method extracts surfactants such as alkylaryl sulfonates, alkoxylated alkyl phenol sulfonates, alkoxylated alkylphenol sulfates, alkoxylated sulfonated or sulfated alcohols and concentrates them in the extraction middle phases.

Other materials which may be present in the produced emulsions are various thickening agents such as biopolymers and synthetic polymers, e.g., polysaccharides and polyacrylamides. Salts which occur naturally in the formation or were added to the flooding water may be present. Additionally, the invention process is also effective in extracting surfactants from emulsions which contain various solubilizers, which are usually added to enhance surfactant solubility. These solubilizers include the water-soluble alcohols or polyhydric alcohols, ether alcohols, alkoxylated phenols and alkoxylated alkyl phenols, alkoxylated alcohols, polyalkoxylated mercaptans, as well as the sulfated or sulfonated derivatives of the alkoxylated phenols or the alkoxylated alcohols.

Produced emulsions will normally be in the form of oil-in-water emulsions and water-in-oil emulsions. Many times, an oil-in-water emulsion will separate over time with the aid of gravity to a water-in-oil emulsion and an aqueous phase. Oil soluble sulfonate surfactants usually speed up this process.

Certain pretreatment steps may be optionally employed to improve the extraction and concentration of the surfactants in the two middle phases. Separation by gravity of the produced emulsion into predominantly oily and aqueous phases will reduce the volume of produced oily emulsion to be treated by the extraction method. Likewise, the employment of a heater treater or similar apparatus to process the produced emulsion prior to the extraction method will also substantially reduce the volume of the emulsion to be treated, as well as improve the efficiency of the extraction method.

Third, the addition of oil soluble, high equivalent weight surfactants to the produced emulsion may also significantly aid gravity separation in reducing oily emulsion volume. Sulfonate surfactants which tend to be oil soluble and have an average equivalent weight within the range of about 400 to about 600 are especially preferred for pretreatment of the produced emulsions. One example is the compound sold under the tradename TRS-18 by Witco Chemical Company having an equivalent weight of about 500. This oil soluble sulfonate may be added in concentrations ranging from about 0.5% to about 4.0%. However, the later addition of a water soluble sulfonate surfactant may be required for efficient extraction by the present invention when such oil soluble sulfonates are added during the pretreatment step.

The presence of certain polymers in the produced emulsion may also require a pretreatment washing step. Some biopolymers such as polysaccharides may cause the creation of a fourth phase and inhibit each extraction of surfactants into the middle phase with the method of the instant invention. But it has been discovered that the effect of these polymers on the extraction method can be obviated by adding brine or water in quantities of about 1 to about 5 volumes water per volume of emulsion to the emulsion, preferably a water-in-oil emulsion. The mixture is allowed to separate by gravity into two phases, an oily emulsion phase and an aqueous phase. Thereafter, the oily phase is employed as the produced emulsion in the extraction treatment.

The concentration of the extraction compounds added varies considerably with the different compounds employed. The cumene sulfonate salts and propylbenzene sulfonate salts may be effective at concentration levels ranging from about 0.3% to about 6.0% by volume, preferably about 0.8% to about 2.0% of the brine employed. The ethyl benzene salts generally require concentration levels about 50% higher than the cumene and propyl benzene sulfonate salts, while the dicyclopentadiene sulfonate salts require about twice the concentration and the xylene sulfonate salts about two and a half times the concentration of the cumene sulfonate salts.

The ethoxylated phenols as second extracting compounds should be used at concentration levels of about 0.1% to about 3% volume per volume of first middle phase. Concentrations of about 0.5% to about 1.0% are most preferred.

The lowest effective concentration of first and second extracting compounds required may vary with the concentration of surfactants in the produced emulsion, the treating temperature, the salinity of the brine, and the types and concentrations of solubilizers and surfactants in the produced emulsion. For example, a higher concentration of extracting compound may be required as surfactant concentration in the produced emulsion increases and as the extraction temperature increases. Higher brine salinities may require higher extracting compound concentrations.

The surfactant extraction is most effectively carried out at a temperature of about 25° C. to about 70° C., with about 30° C. to about 50° C. being the most preferred temperature range. Ideally, the produced emulsion and the first extracting compound solution is preheated to the extraction temperature prior to mixing. But it should be noted that extractions can be successful with certain produced emulsions even at ambient temperatures. The temperature of extraction should be increased when excessive surfactant remains in the aqueous phase after treatment. Conversely, extraction temperature should be decreased when excessive surfactant remains in the water-free and normally surfactant-free oil phase.

Several other corrective steps are available to solve the problem of excessive surfactant remaining in the normally brine-free and surfactant-free oil phase and oil-free aqueous phase. Excessive surfactant in the aqueous phase may be remedied by the addition of brine or water in the initial treating step to reduce the first extracting compound concentration. The addition of divalent ions such as calcium and magnesium will also reduce surfactant remaining in the aqueous phase. Increasing the first extracting compound concentration will remedy the problem of excessive surfactant remaining in the normally surfactant-free and brine-free oil phase.

The preferred embodiment of the extraction method also includes the concurrent addition with the first extracting compound of about 0.1% to about 3% by volume, preferably about 0.5 to about 1.5% of a water soluble sulfonate having an equivalent weight of about 250 to about 450. This results in a substantially decreased middle phase volume having an increased concentration of surfactant contained therein. As before, the oil phase remains substantially surfactant-free and brine-free and the aqueous phase remains oil-free. An especially preferred water-soluble sulfonate is the compound sold under the tradename TRS-40 by Witco Chemical Company having an equivalent weight of about 350.

If the produced emulsion was an oil-in-water emulsion to which a substantial amount of an oil soluble sulfonate such as TRS-18 was added to reduce its volume and change the emulsion to a water-in-oil emulsion, then it may be necessary to add over 1.5% of the water soluble sulfonate.

The extraction method may be practiced in either a batch or continuous manner. Most of the first extracting compound is partitioned into the oil-free aqueous phase. Thus, the aqueous phase may be recycled and used to treat additional produced emulsion. But since some first extracting compound is lost to each middle phase, additional first extracting compound must be added to the used aqueous phase before it is employed again for additional extraction. And since most of the second extracting compound will be lost to the middle phase, substantial amounts of second extracting compound must be added for additional processing.

For continuous surfactant extraction, it is suggested that a pair of apparatus similar to the widely used, vertical type heater treater or similar to the apparatus disclosed in U.S. Pat. Nos. 2,354,856 and 2,753,046 be employed. The suggested apparatus consists of a vertical cylindrical vessel having perforated plates or baffles spaced throughout the vessel to minimize turbulence in the treating vessel. One vessel is employed for the first extraction step and a second vessel is used for the second extraction. If it is desired to use the single step embodiment of the invention, one vessel should be used for both extracting compounds.

Each vessel should contain a column of brine having dissolved therein the respective extracting compound with the column maintained at a constant extraction temperature between about 25° C. and about 70° C. The produced emulsion is treated by injecting it at the bottom of the vessel and dispersing it within the extracting compound solution by conventional techniques such as impellers, atomizing jets, or static mixers without causing significant turbulence in the upper part of the liquid column. In rising through the column of brine and extracting compound, surfactants are extracted from the dispersed crude oil droplets. At the top of the column, substantially surfactant-free and brine-free crude oil is withdrawn while the surfactants, in the form of a middle phase emulsion, collect in the zone between the water-free crude oil and the aqueous phase. The first middle phase is withdrawn whenever a predetermined volume is exceeded and then transferred to the second vessel for the second extraction. The solution of brine and first extracting compound remains in the vessel and is supplemented with additional first extracting compound and brine when needed. Almost all of the second extracting compound is lost to the middle phase.

Automatic maintenance of the volumetric ratio of the phases is accomplished by placing sensors within at least two of the phases. The first sensor is set at the bottom of the crude oil phase to detect any significant increase in surfactant or brine concentration of the crude oil, with any such increase triggering the introduction of concentrated first extracting compound solution into the fluids entering the vessel. A second sensor is set to detect any significant increase in surfactant or oil in the bottom aqueous phase, with any such increase triggering the introduction of dilute extracting compound solution or brine into the fluids entering the vessel. In a like manner, the sensors terminate the flow of additives when phase volumes and composition normalize. Conductivity-resistivity sensors and FT-IR (Fourier Transform-Infrared Spectroscopy) sensors are examples of instrumentation suitable for electronic transmission of start-stop signals to the pumps controlling introduction of extracting compound solution.

Gas evolution from the emulsions to be treated can be minimized by pressurizing the treating vessel or by pretreating the emulsions to remove such gases. It is further suggested that a portion of the treated, surfactant-free oil be recirculated to act as a diluent for the produced emulsion entering the vessel. Under certain conditions, this will increase extraction efficiency.

The relatively low volume middle phase from the second extraction containing a high concentration of surfactants may be directly injected into the formation as a surfactant slug in a chemical flood, thus, reutilizing the originally injected surfactant. The use of the middle phase of the present extraction invention as a surfactant slug in chemical flooding can produce a substantial savings in the quantities of relatively expensive surfactants that are employed for such flooding, significantly improving the economics of surfactant flooding.

The middle phase may be injected "as is" or in conjunction with other materials as a substitute for the surfactant flooding slug. Recovery efficiencies with the "as is" middle phases will often substantially approach the recovery efficiencies of the originally injected surfactant floods. When the second middle phase is supplemented with additional solubilizers, surfactants, or most preferably, the originally injected surfactant flooding composition, total recovery efficiencies usually equal or surpass the recovery efficiencies of the original flooding composition. Depending on the composition of the emulsions and the formation to be flooded, it is preferred that the second middle phase be mixed with the surfactant composition originally injected in ratios of about 3:1 to about 1:3.

It has also been discovered that the addition of various solubilizers to the middle phase in concentrations ranging from about 0.3% to about 3% increases recovery efficiency under certain conditions. A preferred solubilizer is a composition of sulfated derivatives of alkoxylated alcohols sold under the tradename Alfonic 1412A by Conoco Inc. added in the preferred concentration range of about 0.5% to about 1.5%. For high formation temperature applications, sulfonated solubilizers are preferred additives when the middle phase is reinjected into the formation.

The addition of Alfonic 1412A to a polymer slug following the surfactant also solves two problems encountered in the reutilization of the middle phase in a surfactant slug for chemical flooding. It has been noted in some instances that the injection of a polymer slug following the middle phase significantly increases the pressure change as well as increasing surfactant loss to the core matrix. However, the addition of the Alfonic 1412A solubilizer to the polymer slug in ranges of 0.5% to 1.0% produces a pressure differential and surfactant loss similar to the originally designed surfactant slug and also improves recovery efficiency to a value substantially equal to or surpassing that of the originally designed surfactant system.

The following examples further illustrate the novel surfactant extraction and reutilization method of the present invention. These examples are given by way of illustration and not as limitations on the scope of the invention. Thus, it should be understood that the steps and materials employed in the instant method may be varied to achieve similar results within the scope of the invention.

EXAMPLES 1-7

A water-in-oil emulsion was prepared to simulate the produced emulsions from a West Texas field in the Permian Basin. The following ingredients were mixed at an elevated temperature of about 40° to 54° C.: 100 cm$^3$ of the surfactant slug employed in the Permian Basin field, 100 cm$^3$ of crude oil from the field and 250 cm$^3$ of formation brine. The 100 cm$^3$ of surfactant slug had the same make up of that used in the Permian Basin field, containing 1.6% Witco TRS-18, 1.86% Witco TRS-40, 1.55% Alfonic 1412A, 0.95% sodium cumene sulfonate, 4% gas oil, 4% clean crude oil from the same field, 10% fresh water and formation brine for the remainder.

The prepared emulsion soon separated into two phases, an upper, surfactant-containing water-in-oil emulsion and a lower aqueous phase. 200 cm$^3$ of surfactant-free Permian crude was added to the upper emulsion phase. 350 cm$^3$ of the above diluted water-in-oil emulsion was extracted with 350 cm$^3$ of formation brine containing 1.8% sodium cumene sulfonate (SCS) at 54° C. Volumes of the three phases are listed below.

| | |
|---|---|
| Upper Oil Phase | 265 cm$^3$ |
| Middle Phase | 69 cm$^3$ |
| Lower Aqueous Phase | 352 cm$^3$ |

The second extraction step was performed on the middle phase to determine the relative effectiveness of different ethoxylated phenols in releasing salable crude oil from the first middle phase. 0.05 and 0.1 cm$^3$ portions of selected ethoxylated phenols as deoiling additives were added to 5 cm$^3$ portions of the first middle phase and the mixtures were allowed to separate into three phases at about 54° C. The ratios of newly freed oil to ethoxylated phenol were also calculated as one measure of each compound's effectiveness. Results of these tests are listed below in Table 1.

TABLE I

| Ex. | Additive | Conc., % (V/V) | Phase Volumes, cm$^3$ Oil | Middle | Brine | Oil:Additive Ratio |
|---|---|---|---|---|---|---|
| 1 | Isopropanol | 1.0 | 0.5 | 3.5 | 1.0 | 10 |
| 2 | Phenol + 2 EO | 1.0 | 0.75 | 2.5 | 1.75 | 15 |
| 3 | Phenol + 4 EO* | 1.0 | 0.8 | 2.8 | 1.4 | 16 |
| 4 | Phenol + 6 EO | 1.0 | 0.9 | 4.1 | 0 | 18 |

TABLE I-continued

| Ex. | Additive | Conc., % (V/V) | Phase Volumes, cm$^3$ Oil | Middle | Brine | Oil:Additive Ratio |
|---|---|---|---|---|---|---|
| 5 | Phenol + 6 EO | 0.5 | 0.75 | 3.75 | 0.5 | 30 |
| 6 | Surfonic ® N-95 | 1.0 | 0.2 | 2.8 | 2.0 | 4 |
| 7 | Surfonic ® N-120 | 1.0 | 0.5 | 2.7 | 1.8 | 10 |

*1:1 blend 2 EO and 6 EO

All of the second extracting compounds except for Example 4 separated the first emulsion middle phase into three new phases, an upper, substantially surfactant-free and water-free oil phase, a microemulsion middle phase and a lower aqueous phase containing the first extracting compound sodium cumene sulfonate and some of the second extracting compound. Although Example 4, using phenol with an average of six ethylene oxide groups did not produce a lower aqueous phase, the second extracting agent did yield a large upper oil phase of salable oil. The Surfonic ® N-95 and N-120 extracting compounds of Examples 6 and 7 are trademarked nonyl phenols containing approximately 9.5 and 12 ethylene oxide groups respectively, sold by Texaco Chemical Company.

Although not an ethoxylated phenol, isopropanol, the extracting agent of Example 1 was run for comparative purposes. Isopropanol is a preferred second extracting compound employed in the related surfactant extraction and concentration process of copending U.S. patent application Ser. No. 559,077, filed Dec. 7, 1973.

The oil/second extracting compound additive ratio in Table I is very informative for each of the examples. The oil/additive ratio is of great importance since FT-IR analyses indicated that most of the ethoxylated phenol added to the first middle phase, partitioned to the second middle phase and consequently, could not be recycled. Thus, a high oil/additive ratio is very important for the economics of this extraction process.

The best results were achieved by the two extractions performed with phenol having approximately six ethylene oxide groups in concentrations of 1% and 0.5% by volume. Although total oil recovery was highest when 1% phenol with six ethylene oxide groups was added, the oil/additive ratio was highest when only 0.5% of the compound was added to the first middle phase.

FT-IR analyses were run on the phases resulting after the addition of the phenol having an average six ethylene oxide groups. The results are listed below in Table II.

TABLE II

| Examples 4 and 5 | Composition, % Surfactant | Oil | Brine |
|---|---|---|---|
| SCS midphase | 6.5 | 27.5 | 66.0 |
| Phenol + 6 EO, 1%, lower phase* | 7.0 | 12.0 | 81.0 |
| Phenol + 6 EO, 0.5%, middle phase | 8.6 | 19.4 | 72.0 |
| Phenol + 6 EO, 0.5%, brine phase | ~1 (SCS) | 0 | ~99 |

*Only two phases formed, a crude oil phase and a lower phase.

The upper oil phases for each extraction contain substantially clean oil without surfactant and brine. Calculations indicated that the extractions of Examples 4 and 5 using 1% and 0.5% of phenol having six ethylene oxide groups, removed approximately 65% and 54%, respectively, of the crude oil present in the first middle phase obtained by extraction with sodium cumene sulfonate.

The FT-IR analyses indicated that the enhanced oil recovery surfactants (TRS-18, TRS-40, Alfonic 1412A) remained concentrated in the middle phase after the second extractions. Thus, the resulting middle phase from the second extraction can be recycled for injection with much the same results as the first extraction middle phase reinjection for chemical flooding in Examples 19-22.

A problem arose with the recycling of the deoiled middle phase of Example 5. After treating with the 0.5% phenol having six ethylene oxide groups at 54° C., the deoiled second middle phase did not solubilize added formation crude from the West Texas field at about 42° C. as was the case with the first middle phases. However, after the addition of about 0.25% weight-/volume TRS-18, an oil soluble sulfonate surfactant, to the second middle phase, the deoiled second middle phase was able to solubilize significant amounts of oil. This indicates that second middle phases can be recycled for reinjection into the formation by reconditioning with additives or diluting with the initially injected surfactant system.

EXAMPLE 8

A sample of produced oil in water emulsion was obtained from a southern Illinois field undergoing a chemical surfactant flood. The emulsion sample did not invert as expected when treated at approximately 38° C. with a solution of 0.1% calcium ions and 0.3% TRS-18 petroleum sulfonate. After treatment with a solution containing 0.4% of calcium ions at 38° C., the emulsion separated into two phases, an upper surfactant-rich oily phase and a lower aqueous phase. The upper oily phase comprised about 10% of the initial emulsion volume. The lower phase was a relatively clear brine having a two phase titration value of approximately 0.7 meq/l versus about 100 meq/l for the injected surfactant formation.

FT-IR analysis of the upper phase indicated that it contained approximately 3.4% surfactant, 12.2% crude oil and 84.4% brine.

A solution of 0.2% w/v TRS-40, a water soluble sulfonate, was added to 76 cm$^3$ of the upper oily phase which had an oil content of approximately 9.3 cm$^3$ (12.2% X 76 cm$^3$). This mixture was then blended with 152 cm$^3$ of surfactant-free crude oil from the southern Illinois formation and extracted at 54° C. with about 228 cm$^3$ of injection brine from the same formation containing 1% w/v sodium cumene sulfonate. A surfactant-rich midphase of about 53 cm$^3$ formed between a lower aqueous phase and an upper crude oil phase.

The first midphase was further treated at approximately 54° C. with 0.26 cm$^3$ (0.5 volume percent) of phenol having six ethylene oxide groups. An upper surfactant-free and water-free crude oil phase was formed having a volume of 11 cm$^3$ and a lower emulsion phase with 40 cm$^3$ volume was also formed. The crude oil/ethoxylated phenol ratio was a very high 40 volumes of oil per volume of ethoxylated phenol added.

EXAMPLES 9-10

The one step extraction process was tried in Examples 9-10. For Example 9, an aqueous solution containing approximately 2% w/v of active ingredients was added to the beginning emulsion of Examples 1-7. The weight ratio of the active ingredients in the aqueous solution of Example 9 was about 9/1 of sodium cumene sulfonate to ortho-isopropyl phenol having about 8.2 ethylene oxide groups. The same ratio of first to second extracting compounds was also employed in Example 10, but the second extracting compound was changed to ortho-tertiary butyl phenol having approximately 8.2 ethylene oxide groups.

The single step extraction process of both examples was performed at approximately 38° C. The middle phase oil content for both examples was reduced to a level comparable to that of the two step extraction procedure of Examples 4 and 5 using sodium cumene sulfonate and phenol with 6 ethylene oxide groups as first and second extracting compounds, respectively. FT-IR analysis indicated that most of the first extracting compound (sodium cumene sulfonate) remained in the lower phase, while most of the nonionic ethoxylated phenols partitioned into the middle phase, as in the previous examples.

EXAMPLES 11-18

Multiple extraction tests for the first extracting compound were run on the emulsion employed in Example 1. One volume of water-in-oil emulsion was diluted with two volumes of surfactant-free crude oil from the West Texas field. The emulsion and oil blend containing 1% surfactant and 4.5% brine (according to FT-IR analysis) was extracted at 55° C. with an equal volume of brine from the West Texas field to which the test extracting compounds were added. Table III lists the minimum concentration of the first extracting compound required to yield three phases, including a substantially surfactant-free and water-free oil phase, a middle-phase and a oil-free aqueous phase.

TABLE II

| EXAMPLE | EXTRACTING COMPOUND | REQUIRED CONC, % |
|---|---|---|
| 11. | Benzene sulfonate, sodium salt | 6+ |
| 12. | Toluene sulfonate, sodium salt | 6+ |
| 13. | Xylene sulfonate, sodium salt | 3.9 |
| 14. | Ethyl benzene sulfonate, sodium salt | 2.5 |
| 15. | Cumene sulfonate, sodium salt | 1.7 |
| 16. | Naphthalene sulfonic acid* | 0.85 |
| 17. | Dicyclopentadiene sulfonate, sodium salt | 3.1 |
| 18. | Alfonic 1412A | No Phase Separation |

*Na$^+$ salt not soluble in brine

The results indicated that the most effective type of first extracting compound was a benzene ring with a two to three carbon chain attached. The cumene, xylene, and ethyl benzene sulfonates were the most effective extraction compounds tested. The sodium dicyclopentadiene sulfonate was also effective at about twice the required concentration for sodium cumene sulfonate. Aromatic rings with substantially longer alkyl side chains are much less water soluble and consequently, are not effective extracting compounds for this process.

The naphthalene sulfonic acid could not be tested as a sodium salt, but was effective at relatively low concentrations in the acid form. However, naphthalene sulfonic acid is a highly corrosive chemical.

A solubilizer, Conoco's Alfonic 1412A was also tried as an extracting compound. Low, medium and high concentrations of 1412A failed to produce phase separation into the three distinct phases of the present invention.

EXAMPLES 19-22

Comparative core floods were performed with the middle phases from the first extraction only of the emulsion of Examples 1-7. These floods were conducted at 43° C. in a Baker Limestone core having a length of 30.5 cm, a pore volume of 130 cm$^3$ and a permeability of 58 millidarcies. The connate fluids in the core were brine from the Permian Basin field and clean crude from the same field containing 25% added heptane. Chemical slug size was 0.18 pore volume in all floods, followed by continuous injection of a 1,000 ppm polysaccharide polymer in deionized water, sold under the trademark Rhodopol by Rhone-Poulenc Chemical Co.

Four floods were undertaken. The first was a core flood with the surfactant slug originally injected at the Permian Basin field. The second core flood employed the first middle phase from the first extraction of Example 1 with 0.1% TRS-18 added. The third core flood consisted of the first middle phase plus 0.1% TRS-18 and 0.1% Alfonic 1412A. The fourth core flood was comprised of two thirds of the originally injected surfactant slug plus one third first middle phase from the first extraction process of Example 1 and 0.033% TRS-18. The results are listed below.

TABLE IV

NET RECOVERY EFFICIENCY (%) OBTAINED BY FLOODING

| | Pore Volumes | | | | |
|---|---|---|---|---|---|
| | 0.5 | 0.75 | 1.0 | 1.25 | 1.5 |
| 19. Original Surfactant Slug | 8 | 30 | 45 | 57 | 61 |
| 20. Midphase + 0.1% TRS-18 | 14 | 33 | 45 | 52 | 58 |
| 21. Example 20 + 0.1% 1412A | 14 | 36 | 45 | 47 | 47 |
| 22. ⅔ Example 19 + ⅓ Example 20 | 6 | 22 | 42 | 52 | 59 |

The table shows that the recovery efficiencies for all of the floods containing the first middle phase were slightly lower than the originally designed system per pore volume injected. However, the amount of surfactant in the middle phase floods was probably lower than that of the originally designed surfactant system.

Best results with the middle phase were obtained with the fourth core flood consisting of one third middle phase, two thirds originally injected surfactant slug and 0.033% TRS-18. This blend of original surfactant slug and middle phase at a two to one ratio achieved a relatively high recovery efficiency of 61%, the same as that of the original designed surfactant slug, but at a greater injected pore volume of about 1.6 compared to about 1.35. The fourth core flood suggests that blending of the originally injected surfactant with the middle phase from the extraction process is an effective technique for reutilizing surfactants.

Many other variations and modifications may be made in the concept described above by those skilled in the art without departing from the concept of the present invention. Accordingly, it should be clearly understood that the concepts disclosed in the description are illustrative only and are not intended as limitations on the scope of the invention.

What is claimed is:

1. A method for extracting and concentrating enhanced oil recovery surfactants into a relatively small volume surfactant-rich middle phase from produced emulsions comprising oil, water and surfactant, which comprises:

mixing a produced emulsion with an extracting compound solution of water containing about 0.3% to about 6.0% of a first extracting compound selected from the group consisting of the alkali metal salts and ammonium salts of propyl benzene sulfonate, cumene sulfonate, ethyl benzene sulfonate, methyl ethyl benzene sulfonate, diethyl benzene sulfonate, methyl propyl benzene sulfonate, xylene sulfonate and dicyclopentadiene sulfonate;

allowing the mixture of produced emulsion and first extracting compound solution to separate into at least three phases, including a substantially surfactant-free and water-free crude oil phase, a first relatively low volume middle phase containing surfactant, oil and water, and an oil-free aqueous phase;

mixing about a 0.1% to about 3.0% volume of a second extracting compound per volume of first middle phase with said first middle phase, said second extracting compound consisting of an ethoxylated phenol with an average of about one to about fifteen ethylene oxide groups and having an alkyl side chain containing 0 to about 12 carbon atoms; and allowing the mixture of first low volume middle phase and ethoxylated phenol to separate into at least two phases, including a substantially surfactant-free and water-free crude oil phase, a second relatively small volume surfactant-rich middle phase containing surfactant, oil and water, and usually, a third oil-free aqueous phase.

2. The method of claim 1, wherein the produced emulsion is processed through a heater treater, settling tank or other mechanical devices that reduce the volume of emulsion to be mixed with the first extracting compound solution.

3. The method of claim 1, wherein the produced emulsion is first allowed to separate into two phases, an emulsion phase and an aqueous phase, and the resulting emulsion phase, instead of the produced emulsion, is then mixed with the first extracting compound solution.

4. The method of claim 1, wherein the water containing the first extracting compound is a brine.

5. The method of claim 1, wherein the ethoxylated phenol is added to the first middle phase in an aqueous solution.

6. The method of claim 1, wherein all of the steps of mixing and allowing the mixtures to separate are carried out at a temperature of about 25° C. to about 70° C.

7. The method of claim 1, wherein either oil-free aqueous phase is supplemented with additional extracting compound and mixed with an emulsion phase for subsequent extractions.

8. The method of claim 1, wherein the ethoxylated phenol contains an average of about two to about eight ethylene oxide groups and has no alkyl side chains.

9. The method of claim 1, wherein the ethoxylated phenol is a nonyl phenol.

10. The method of claim 10, wherein the nonyl phenol contains an average of about ten to about fifteen ethylene oxide groups.

11. The method of claim 1, wherein a mixture of ethoxylated phenols is employed.

12. A method for extracting and concentrating enhanced oil recovery surfactants into a relatively small volume, surfactant-rich middle phase from produced emulsions comprising oil, brine and surfactant, which comprises:

allowing the produced emulsion to settle into two phases, an emulsion phase and an aqueous phase;

mixing the emulsion phase with a solution containing about 0.1% to about 3.0% of a water soluble sulfonate surfactant having an equivalent weight of about 250 to about 450 and about 0.3% to about 6% of a first extracting compound selected from the group consisting of the sodium salts of propyl benzene sulfonate, cumene sulfonate, ethyl benzene sulfonate, methyl ethyl benzene sulfonate, diethyl benzene sulfonate, methyl propyl benzene sulfonate, xylene sulfonate and dicyclopentadiene sulfonate at a temperature of about 25° C. to about 70° C.;

allowing the mixture of emulsion, and first extracting compound and water soluble sulfonate solution to separate at a temperature of about 25° C. to about 70° C. into at least three phases, including a substantially surfactant-free and brine-free crude oil phase, a first relatively low volume middle phase containing surfactant, oil and brine and an oil-free aqueous phase;

mixing about a 0.3% to about 1.5% volume of ethoxylated phenol having about two to about eight ethylene oxide groups per volume of first middle phase with said first middle phase at a temperature of about 30° C. to about 50° C.; and allowing the mixture of first middle phase and ethoxylated phenol to separate at a temperature of about 30° C. to about 50° C. into at least two phases, including a substantially surfactant-free and brine-free crude oil phase, a second relatively small volume, surfactant-rich middle phase containing surfactant, oil and brine, and, usually, a third oil-free aqueous phase.

13. A method for extracting and concentrating enhanced oil recovery surfactants into a relatively small volume surfactant-rich middle phase from produced emulsions comprising oil, water and surfactant, which comprises:

mixing a produced emulsion with an extracting compound solution of water containing about 0.3% to about 6.0% of a first extracting compound selected from the group consisting of the alkali metal salts and ammonium salts of propyl benzene sulfonate, cumene sulfonate, ethyl benzene sulfonate, methyl ethyl benzene sulfonate, diethyl benzene sulfonate, methyl propyl benzene sulfonate, xylene sulfonate and dicyclopentadiene sulfonate;

allowing the mixture of produced emulsion and first extracting compound solution to separate into at least three phases, including a substantially surfactant-free and water-free crude oil phase, a first relatively low volume middle phase containing surfactant, oil and water, and an oil-free aqueous phase;

mixing the first middle phase and aqueous phase together and allowing them to separate into upper and lower phases;

mixing about 0.1% to about 3.0% volume of a second extracting compound per volume of upper phase with said upper phase, said second extracting compound consisting of an ethoxylated phenol with an average of about one to about fifteen ethylene oxide groups and having an alkyl side chain containing 0 to about 12 carbon atoms; and allowing the mixture of said upper phase and ethoxylated phenol to separate into at least two phases, including a substantially surfactant-free and water-free crude oil phase, a second relatively small volume, surfactant-rich middle phase containing surfactant, oil and water, and, usually, a third oil-free aqueous phase.

14. A method for extracting and concentrating enhanced oil recovery surfactants into a relatively small volume surfactant-rich middle phase from produced emulsions comprising oil, water and surfactant, which comprises:

mixing a produced emulsion with an extracting compound solution of water containing about 0.3% to about 6.0% of a first extracting compound selected from the group consisting of the alkali metal salts and ammonium salts of propyl benzene sulfonate, cumene sulfonate, ethyl benzene sulfonate, methyl ethyl benzene sulfonate, diethyl benzene sulfonate, methyl propyl benzene sulfonate, xylene sulfonate and dicyclopentadiene sulfonate;

allowing the mixture of produced emulsion and first extracting compound solution to separate into at least three phases, including a substantially surfactant-free and water-free crude oil phase, a first relatively low volume middle phase containing surfactant, oil and water, and an oil-free aqueous phase;

mixing together the first middle phase, aqueous phase and about a 0.1% to about 3% by volume of a second extracting compound consisting of an ethoxylated phenol with an average of about one to about fifteen ethylene oxide groups and having an alkyl side chain containing about 0 to about 12 carbon atoms; and allowing the mixture of the first middle phase, the aqueous phase and the ethoxylated phenol to separate into at least two phases, including a substantially surfactant-free and water-free crude oil phase, a second relatively small volume, surfactant-rich middle phase containing surfactant, oil and water, and, usually, a third oil-free aqueous phase.

15. A method for reutilizing surfactants in a surfactant flood that are entrained within a produced emulsion comprising oil, water and surfactant, which comprises:

allowing the produced emulsion to settle into two phases, an emulsion phase and an aqueous phase;

mixing the emulsion phase with an extracting compound solution of water containing about 0.3% to about 6.0% of a first extracting compound selected from the group consisting of the alkali metal salts and ammonium salts of propyl benzene sulfonate, cumene sulfonate, ethyl benzene sulfonate, methyl ethyl benzene sulfonate, diethyl benzene sulfonate, methyl propyl benzene sulfonate, xylene sulfonate and dicyclopentadiene sulfonate;

allowing the mixture of emulsion and first extracting compound solution to separate into at least three phases, mixing about a 0.1% to about 3% volume of a second extracting compound per volume of first middle phase with said first middle phase, said second extracting compound consisting of an ethoxylated phenol with an average of about one to about fifteen ethylene oxide groups and having an alkyl side chain containing 0 to about 12 carbon atoms;

allowing the mixture of first middle phase and ethoxylated phenol to separate into at least two phases, including a substantially surfactant-free and water-free crude oil phase, a second relatively lower volume, surfactant-rich middle phase containing surfactant, oil and water, and, usually, a third oil-free aqueous phase; and injecting the second middle phase as a surfactant slug in a surfactant flood.

16. The method of claim 15, wherein the second middle phase is mixed with a surfactant and injected as a surfactant slug in a surfactant flood.

17. The method of claim 15, wherein about 0.3% to about 3.0% of a solubilizer is added to the middle phase prior to injection as a surfactant slug in a surfactant flood.

18. The method of claim 17, wherein the solubilizer is comprised of sulfated derivatives of alkoxylated alcohols.

19. The method of claim 17, wherein the solubilizer is sulfonated.

20. The method of claim 15, wherein the middle phase is mixed with a composition and then injected as a surfactant slug in a surfactant flood, said composition being the same in makeup as to the surfactant slug originally injected into the formation.

21. The method of claim 15, wherein a polymer slug is injected into the formation after the injection of the middle phase, said polymer slug containing a solubilizer.

* * * * *